US011418362B2

(12) United States Patent
Li et al.

(10) Patent No.: US 11,418,362 B2
(45) Date of Patent: Aug. 16, 2022

(54) SYSTEMS AND METHODS FOR GROUP CONTROL USING SERVICE DATA OBJECTS

(71) Applicant: SCHNEIDER ELECTRIC IT CORPORATION, Foxboro, MA (US)

(72) Inventors: Junshan Li, Shanghai (CN); Guohui Wang, Shanghai (CN); Lei Xu, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/104,803

(22) Filed: Nov. 25, 2020

(65) Prior Publication Data

US 2022/0166645 A1 May 26, 2022

Related U.S. Application Data

(60) Provisional application No. 63/118,328, filed on Nov. 25, 2020.

(51) Int. Cl.
*H04L 12/18* (2006.01)
*H04L 12/40* (2006.01)
*H04L 41/0659* (2022.01)

(52) U.S. Cl.
CPC .... *H04L 12/40019* (2013.01); *H04L 12/1895* (2013.01); *H04L 12/40013* (2013.01); *H04L 41/0659* (2013.01)

(58) Field of Classification Search
CPC .......... H04L 12/1895; H04L 12/40013; H04L 12/40019; H04L 12/403; H04L 12/4625;
(Continued)

(56) References Cited

U.S. PATENT DOCUMENTS 7,051,143 B2    5/2006  White, III et al.
2004/0054829 A1*  3/2004  White, III .............. H04L 49/90
                                                                   700/1
(Continued)

FOREIGN PATENT DOCUMENTS

CN         110968022 A      4/2020

OTHER PUBLICATIONS

Website, CAN in Automation (CiA), the webpage at <https://www.can-cia.org/can-knowledge/canopen/sdo-protocol/> as it existed on Oct. 24, 2020, retrieved from the Wayback Machine on Feb. 24, 2021.

(Continued)

*Primary Examiner* — Le H Luu
(74) *Attorney, Agent, or Firm* — Lando & Anastasi, LLP

(57) ABSTRACT

Techniques for group control using service data objects (SDO) are disclosed. A device controller is configured to perform operations including: receiving, from device controllers that are configured to control devices so that the devices operate based on a shared set point, SDO messages using an SDO protocol; determining that the device controller is a master device controller for the device controllers, based at least on the SDO messages; and sending a setpoint update message including a modified value of the shared set point, using the SDO protocol, to slave device controllers in the device controllers, wherein a slave device controller in the slave device controllers is configured to adjust operation of at least one slave device in the devices, based at least on the setpoint update message.

20 Claims, 11 Drawing Sheets

(58) Field of Classification Search
CPC ... H04L 41/0659; H04L 47/32; H04L 67/125; G05B 19/4186; G05D 23/1917; G06F 11/1076; G06F 3/0482; G06F 3/0653; H04W 36/03

See application file for complete search history.

(56) References Cited

U.S. PATENT DOCUMENTS

| | | |
|---|---|---|
| 2007/0177613 A1 | 8/2007 | Shorty et al. |
| 2015/0063109 A1* | 3/2015 | Han .................. H04L 67/12 370/235 |
| 2016/0047569 A1 | 2/2016 | Fadell et al. |
| 2017/0132075 A1* | 5/2017 | Zastrow ............. G06F 11/1076 |
| 2017/0223615 A1* | 8/2017 | Lee ..................... H04W 48/14 |
| 2018/0225244 A1 | 8/2018 | Dorneanu et al. |
| 2018/0314277 A1* | 11/2018 | Moore ................ H04L 12/2827 |
| 2020/0045519 A1* | 2/2020 | Raleigh ................ G06Q 30/02 |
| 2020/0050377 A1* | 2/2020 | Nakajima ............. G06F 3/0653 |
| 2020/0125076 A1* | 4/2020 | Zhang ................ G05B 19/4183 |
| 2020/0272589 A1* | 8/2020 | Rennig ................ G05B 19/042 |
| 2020/0310394 A1* | 10/2020 | Wouhaybi ........... G05B 19/042 |
| 2021/0108822 A1* | 4/2021 | Marik ................... G05B 15/02 |

OTHER PUBLICATIONS

Extended European Search Report from corresponding European Application No. 21206460.4 dated Apr. 14, 2022.

* cited by examiner

SYSTEMS AND METHODS FOR GROUP CONTROL USING SERVICE DATA OBJECTS

RELATED APPLICATIONS

This application claims the benefit of U.S. Provisional Patent Application Ser. No. 63/118,328, titled "SYSTEMS AND METHODS FOR GROUP CONTROL USING SERVICE DATA OBJECTS," filed on even date herewith, which is hereby incorporated by reference in its entirety.

BACKGROUND

In data centers, multiple devices may be networked together, with a master device controlling the operation of slave devices. For example, a group of air conditioners may be networked together, with a master air conditioner controlling cooling and load balancing across the group. However, communication constraints typically limit the size of such device groups. For example, a group of air conditioners may be limited to twelve or fewer units. In addition, when a master device fails, manual intervention may be required to designate a new master.

Approaches described in this section have not necessarily been conceived and/or pursued prior to the filing of this application. Accordingly, unless otherwise indicated, approaches described in this section should not be construed as prior art.

SUMMARY

One or more embodiments include techniques for using the Service Data Objects (SDO) protocol to expand the number of units (e.g., air conditioning units) that are able to operate together in a group. In addition, one or more embodiments include techniques for providing redundant master control within the group, using master election techniques implemented using the SDO protocol. One or more embodiments use the SDO protocol to implement function blocks relating to key aspects of controller communication logic. Frame transmissions between devices may be handled in a particular order, according to priority and/or running status. Frame triggering and suppression mechanisms may help optimize busload, thus improving communication efficiency within the network of devices.

Techniques described herein may help improve the efficiency and reliability of device groups in data centers. For example, when used to control air conditioners in a data center, techniques described herein may help to ensure that room equipment operates at a suitable temperature and humidity, and may help reduce the energy consumption and daily expenses associated with managing a data center. Software or firmware that implements techniques described herein may be built into device controllers (e.g., as a software or firmware upgrade to existing devices), so that additional communication/control modules are not required.

One or more embodiments support a significantly larger number of group devices, compared with traditional approaches. The SDO protocol does not require a separate Ethernet connection for each controller, and therefore is not limited by Ethernet switching capacity. As described herein, techniques that use the SDO protocol may therefore allow for large-scale group communication and coordination, without the practical limitations of Ethernet-based approaches.

In general, in one aspect, a device controller is configured to perform operations including: receiving, from device controllers that are configured to control devices so that the devices operate based on a shared set point, Service Data Objects (SDO) messages using an SDO protocol; determining that the device controller is a master device controller for the device controllers, based at least on the SDO messages; and sending a setpoint update message including a modified value of the shared set point, using the SDO protocol, to slave device controllers in the device controllers, wherein a slave device controller in the slave device controllers is configured to adjust operation of at least one slave device in the devices, based at least on the setpoint update message. Determining that the device controller is the master device controller for the device controllers may include determining, based at least on the SDO messages, that the device controller has at least one of a lower device controller identifier or a higher device controller identifier than another device controller identifier associated with another device controller. At least one of the SDO messages may include a target address, an object dictionary index, an object area sub-index, and a device status value. The object dictionary address and object area sub-index may correspond to a location, in a manufacturer-specific section of an object dictionary of a device at the target address, in which to write the device status value.

The operations may further include: detecting a presence of a new slave device controller; and responsive to detecting the presence of the new slave device controller, sending the modified value of the shared setpoint to the new slave device controller, using the SDO protocol.

The operations may further include: prior to detecting the presence of a new slave device controller, computing a group metric for the group; and responsive to detecting the presence of the new slave device controller, computing a revised group metric for the group that includes the new slave device controller.

The operations may further include suppressing transmission of at least one SDO message in the plurality of SDO messages until a change in a value associated with a function of the at least one SDO message is detected.

The operations may further include: computing a group metric for the group; determining that a particular slave device controller in the slave device controllers is offline; and responsive to determining that the particular slave device controller is offline, computing a revised group metric for the group that excludes the particular slave device controller.

In general, in one aspect, a system includes devices and device controllers. The device controllers are configured to control the devices so that the devices operate based on a shared set point, at least by collectively performing operations including: exchanging Service Data Objects (SDO) messages using an SDO protocol; determining a master device controller in the device controllers, based at least on the plurality of SDO messages; sending a setpoint update message including a modified value of the shared set point, using the SDO protocol, from the master device controller to slave device controllers in the device controllers; and adjusting operation of a slave device in the slave devices, by at least one slave device controller in the slave device controllers, based at least on the setpoint update message.

The operations may further include: detecting a presence of a new slave device controller; and responsive to detecting the presence of the new slave device controller, sending the modified value of the shared setpoint to the new slave device controller, using the SDO protocol.

The operations may further include: prior to detecting the presence of a new slave device controller, computing a group metric for the group; and responsive to detecting the presence of the new slave device controller, computing a revised group metric for the group that includes the new slave device controller.

The operations may further include suppressing transmission of at least one SDO message in the plurality of SDO messages until a change in a value associated with a function of the at least one SDO message is detected.

The operations may further include: determining that the master device controller is offline; and determining a new master device controller, from the slave device controllers, based at least on the SDO messages. Determining the new master device controller may include determining, based at least on the SDO messages, a device controller in the slave device controllers having at least one of a lower device controller identifier or a higher device controller identifier than another device controller.

The operations may further include: computing a group metric for the group; determining that a particular slave device controller in the slave device controllers is offline; and responsive to determining that the particular slave device controller is offline, computing a revised group metric for the group that excludes the particular slave device controller.

In general, in one aspect, one or more non-transitory machine-readable media store instructions that, when executed by one or more processors, cause: exchanging, by device controllers that are configured to control a devices so that the devices operate based on a shared set point, Service Data Objects (SDO) messages using an SDO protocol; determining a master device controller in the device controllers, based at least on the SDO messages; sending a setpoint update message including a modified value of the shared set point, using the SDO protocol, from the master device controller to slave device controllers in the device controllers; and adjusting operation of a slave device in the devices, by at least one slave device controller in the slave device controllers, based at least on the setpoint update message.

The one or more non-transitory machine-readable media may further store instructions that, when executed by one or more processors, cause: detecting a presence of a new slave device controller; and responsive to detecting the presence of the new slave device controller, sending the modified value of the shared setpoint to the new slave device controller, using the SDO protocol.

The one or more non-transitory machine-readable media may further store instructions that, when executed by one or more processors, cause: prior to detecting the presence of a new slave device controller, computing a group metric for the group; and responsive to detecting the presence of the new slave device controller, computing a revised group metric for the group that includes the new slave device controller.

The one or more non-transitory machine-readable media may further store instructions that, when executed by one or more processors, cause: determining that the master device controller is offline; and determining a new master device controller, from the slave device controllers, based at least on the SDO messages. Determining the new master device controller includes determining, based at least on the SDO messages, a device controller in the slave device controllers having at least one of a lower device controller identifier or a higher device controller identifier than another device controller.

The one or more non-transitory machine-readable media may further store instructions that, when executed by one or more processors, cause: computing a group metric for the group; determining that a particular slave device controller in the slave device controllers is offline; and responsive to determining that the particular slave device controller is offline, computing a revised group metric for the group that excludes the particular slave device controller.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Figure 1A:
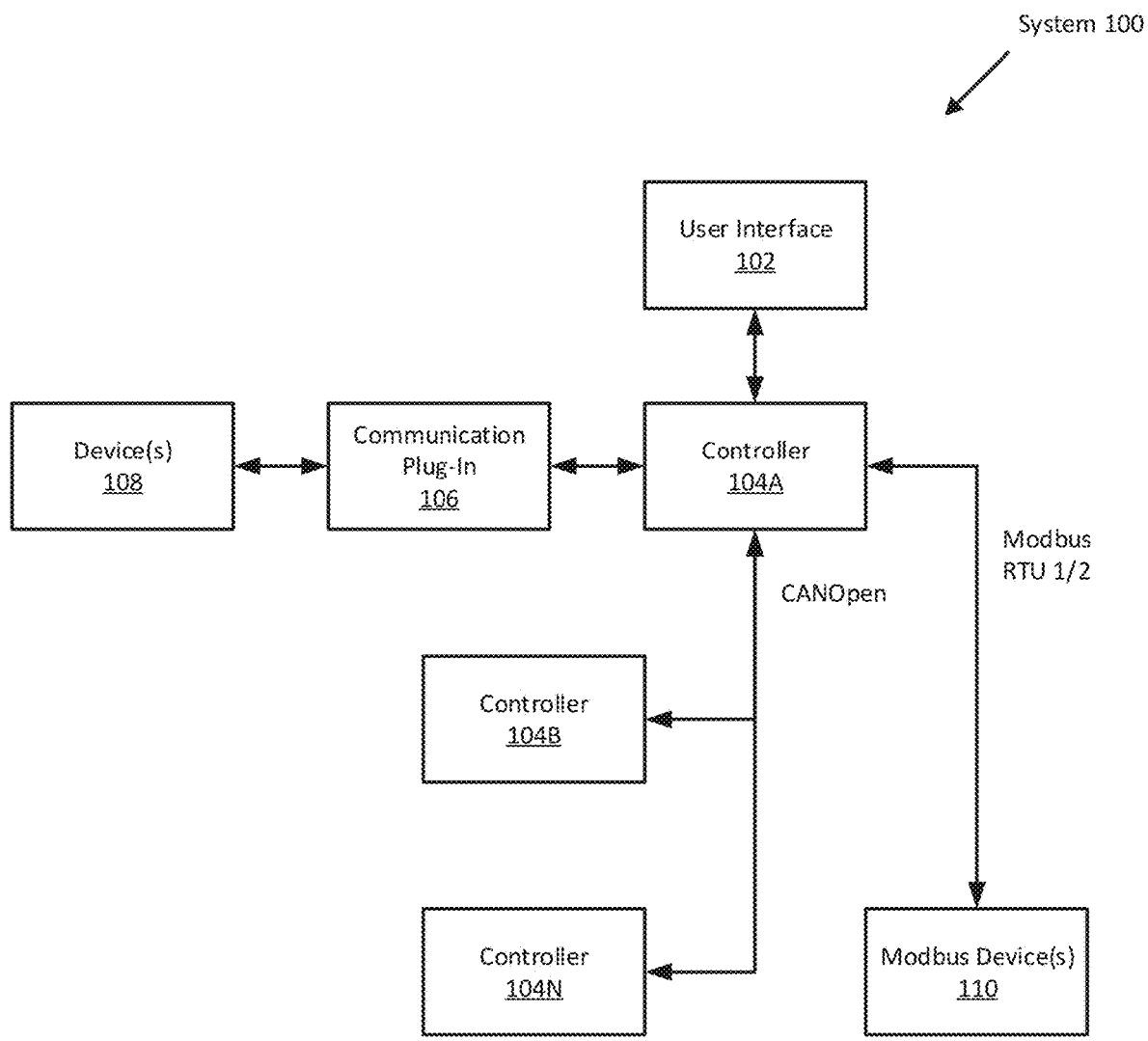
FIGS. 1A-1B are block diagrams of an example of a system according to an embodiment.
Figure 1B:
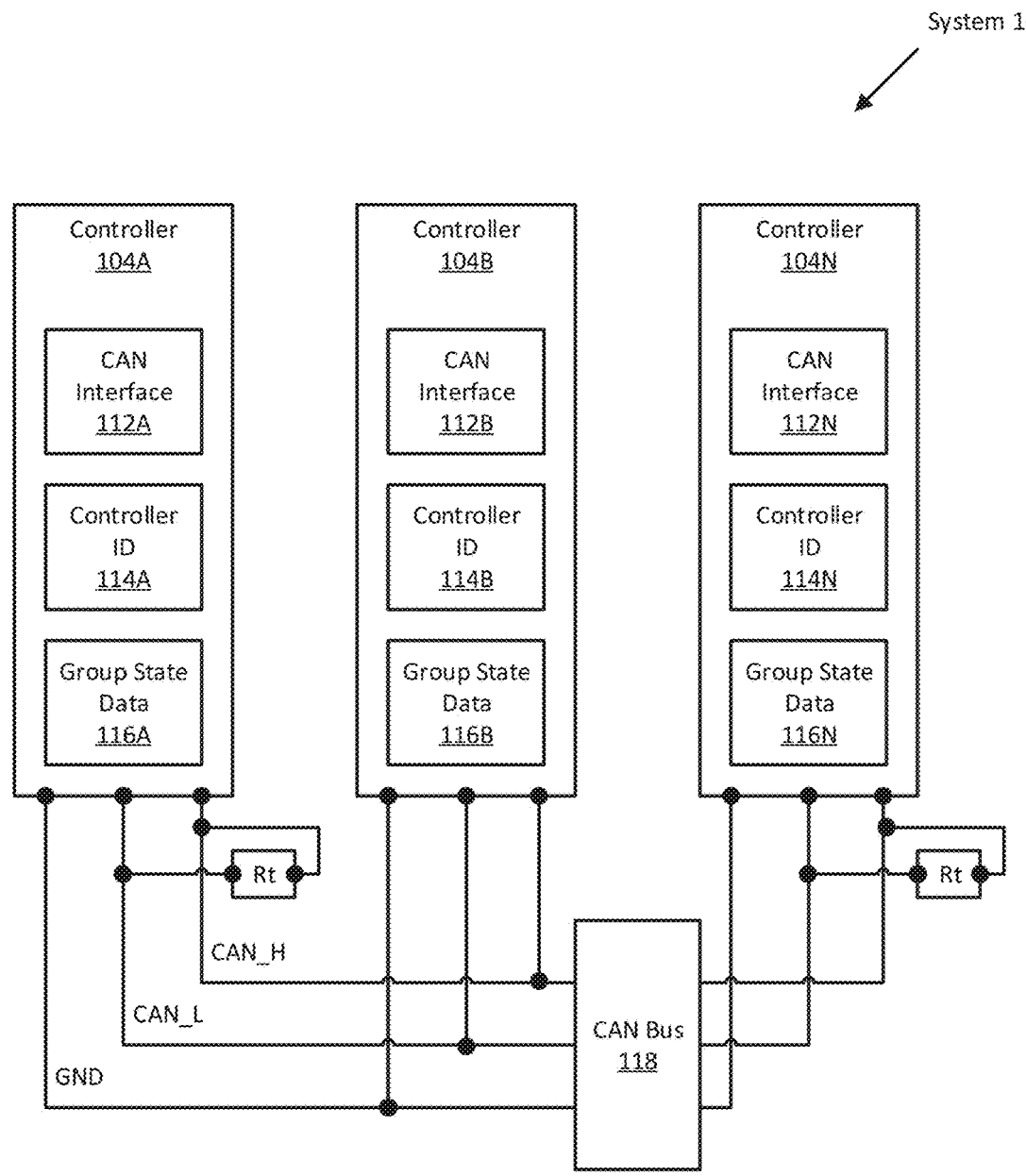

FIGS. 1A-1B are block diagrams of an example of a system 100 according to an embodiment. In an embodiment, the system 100 may include more or fewer components than the components illustrated in FIGS. 1A-1B. The components illustrated in FIGS. 1A-1B may be local to or remote from each other. The components illustrated in FIGS. 1A-1B may be implemented in software and/or hardware. Each component may be distributed over multiple applications and/or machines. Multiple components may be combined into one application and/or machine. Operations described with respect to one component may instead be performed by another component.

In an embodiment, as illustrated in FIG. 1A, the system 100 includes multiple controllers 104. In this example, there are three controllers 104A, 104B, 104N. The controllers 104 are configured to communicate with each other using a controller area network (CAN) protocol, such as the CANopen Service Data Objects (SDO) protocol. In some cases, an expedited version of the SDO protocol may be used. Each controller 104 is configured to control one or more operational parameters of one or more devices 108. For example, a controller 104 for an air conditioning unit may be configured to control one or more of: fan speed; temperature setpoint; humidity setpoint; etc. A communication plug-in 106 may provide a communications bridge between the controller 104 and a device 108. For example, the controller 104 may be a Modicon M172 Controller by Schneider Electric and the communication plug-in 106 may be a plug-in module that allows the controller 104 to communicate with one or more devices 108 via a Process Field Bus (PROFIBUS) and/or Building Automation and Control Network (BACnet) protocol. One or more of the controllers 104 may also be configured to communicate with one or more Modbus devices 110 using, for example, Modbus Remote Terminal Unit (RTU) 1 and/or Modbus RTU 2 protocols. Other device types, controller types, and/or protocols may be used.

In an embodiment, each controller 104 is configured to store information about group control in an SDO object dictionary as follows: status variables in the range 2300H-3687H (e.g., temperature sensor values, humidity sensor values, logic control values, PID calculations, and/or other kinds of status variables) and setup variables in the range 4000h-4FFFH. The 4000h-4FFFH range is an EEPROM range that is persistent even in the event of a power failure/restart and may include: setpoint values (e.g., temperature setpoint values, humidity setpoint values, and/or other setpoint values); alarm delay times; alarm thresholds; and/or other kinds of setup variables. Both of the aforementioned ranges are manufacturer-specific subprotocol areas, and the values stored therein are not part of the SDO specification.

In an embodiment, a user interface 102 refers to hardware and/or software configured to facilitate communications between a user and a controller 104. For example, the user interface 102 may allow a user to configure controller groups, specify setpoints (e.g., temperature and/or humidity setpoints), and/or specify one or more other parameters used by the controller 104. A user interface 102 renders user interface elements and receives input via user interface elements. A user interface 102 may be a graphical user interface (GUI), a command line interface (CLI), a haptic interface, a voice command interface, and/or any other kind of interface or combination thereof. In an embodiment, the user interface 102 is a human-machine interface (HMI) and may be integrated with the controller 104. For example, the user interface 102 may be an HMI presented on a Magelis Easy GXU 3512 by Schneider Electric, or another kind of HMI. Examples of user interface elements include checkboxes, radio buttons, dropdown lists, list boxes, buttons, toggles, text fields, date and time selectors, command lines, sliders, pages, and forms.

In an embodiment, different components of a user interface 102 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 102 may be specified in one or more other languages, such as Java, Python, Perl, C, C++, and/or any other language or combination thereof.

Continuing the example of FIG. 1A, as illustrated in FIG. 1B, the controllers 104 may be configured to communicate with each other via a CAN bus 118. Specifically, each controller 104 may include a CAN interface 112 that the controller 104 accesses to communicate with other controllers over the CAN bus 118. The controllers 104 may be arranged in a simple daisy chain configuration.

In an embodiment, the CAN interface 112 sends and receives signals via wires designated as "high" (CAN_H) (connected, for example, to terminal "H" on a CANopen interface), "low" (CAN_L) (connected, for example, to terminal "L" on a CANopen interface), and ground (GND) (connected, for example, to a controller 104's GND equipotential). Resistors (Rt) (having, for example, resistances of 120Ω on both ends of the fieldbus) are included to ensure proper resistance between the high and low wires. Each controller 104 has a controller identifier (ID) 114 that uniquely identifies that controller 104. The controller ID 114 is unique within a group of controllers 104. The controller ID 114 may also be referred to as a CAN ID or node ID. A COB-ID, described below, may include a controller ID 114. In some cases, the controller ID 114 may be programmed into the controller 104's electrically erasable programmable read-only memory (EEPROM) or in another memory location. Each controller 104 in the group may be configured to store group state data 116. The group state data 116 includes information about the statuses of the controllers 104 in the group, such as their controller ID's 114, running status (e.g., online, offline, unknown), which controller 104 is designated as master, and/or another kind of information or combination thereof.

In an embodiment, communication between controllers 104 take place over shielded and "twisted pair" cable. The cable may have, for example, two 0.5 mm$^2$ section conductors (e.g., American Wire Gauge (AWG) 22), and a braid such as Belden cable 3015A (having a characteristic impedance of 120Ω) and polyvinyl chloride (PVC) sleeve. The nominal capacity between the conductors may be about 36 pF/m, and nominal capacity between the conductor and shielding may be about 68 pF/m. Alternatively, another kind of cable, braid, and/or specification(s) may be used.

In an embodiment, one or more components of the system 100 are implemented on one or more digital device controllers. The term "digital device controller" generally refers to any hardware device controller that includes a processor. A digital device controller may refer to a physical device controller executing an application or a virtual machine. Examples of digital device controllers include a computer, a tablet, a laptop, a desktop, a netbook, a server, a web server, a network policy server, a proxy server, a generic machine, a function-specific hardware device controller, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device controller, a router, a switch, a controller, an access point, and/or a client device controller.

Figure 2A:
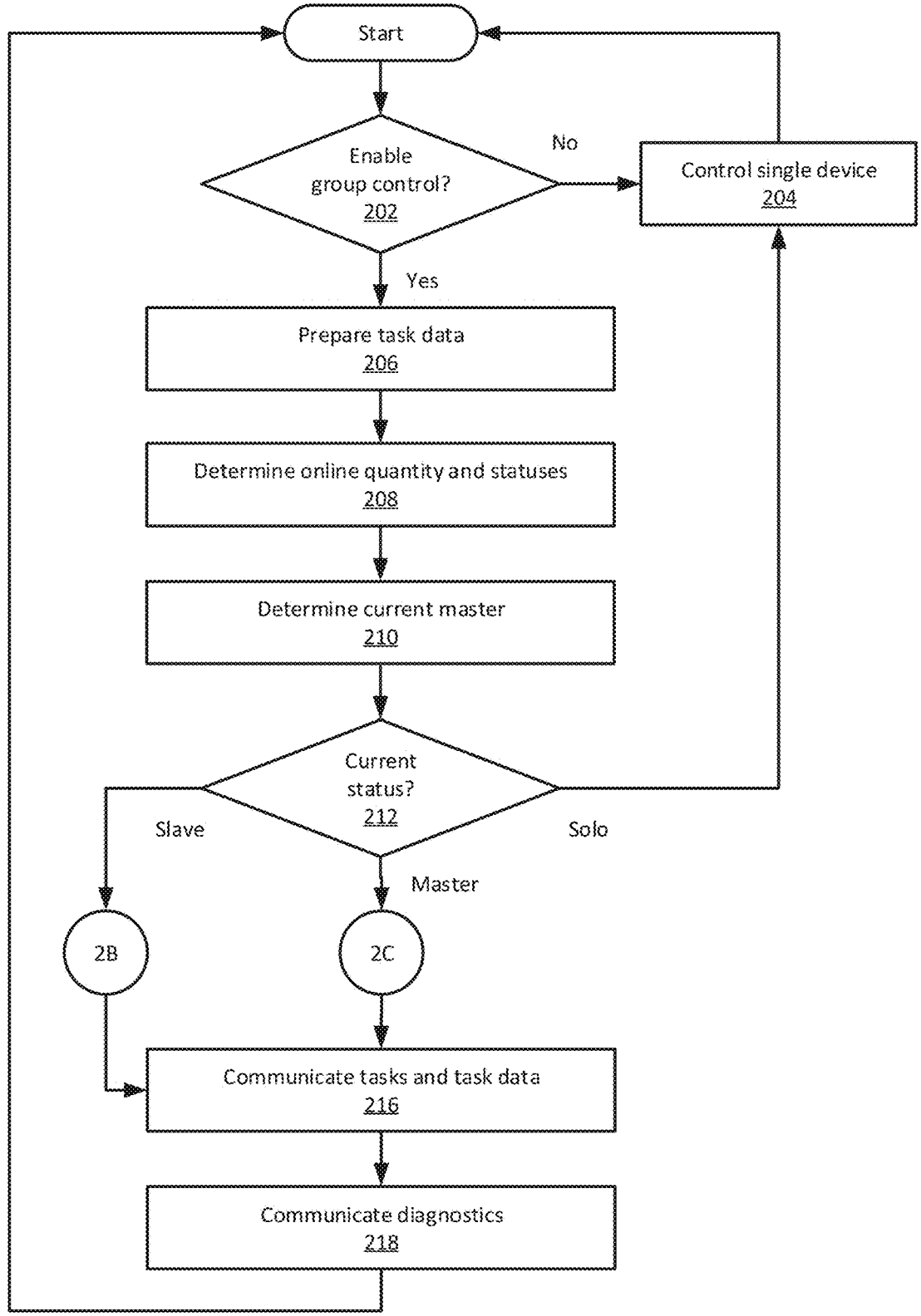
FIGS. 2A-2C are a flow diagram of an example of operations for group control using service data objects according to an embodiment.
Figure 2B:
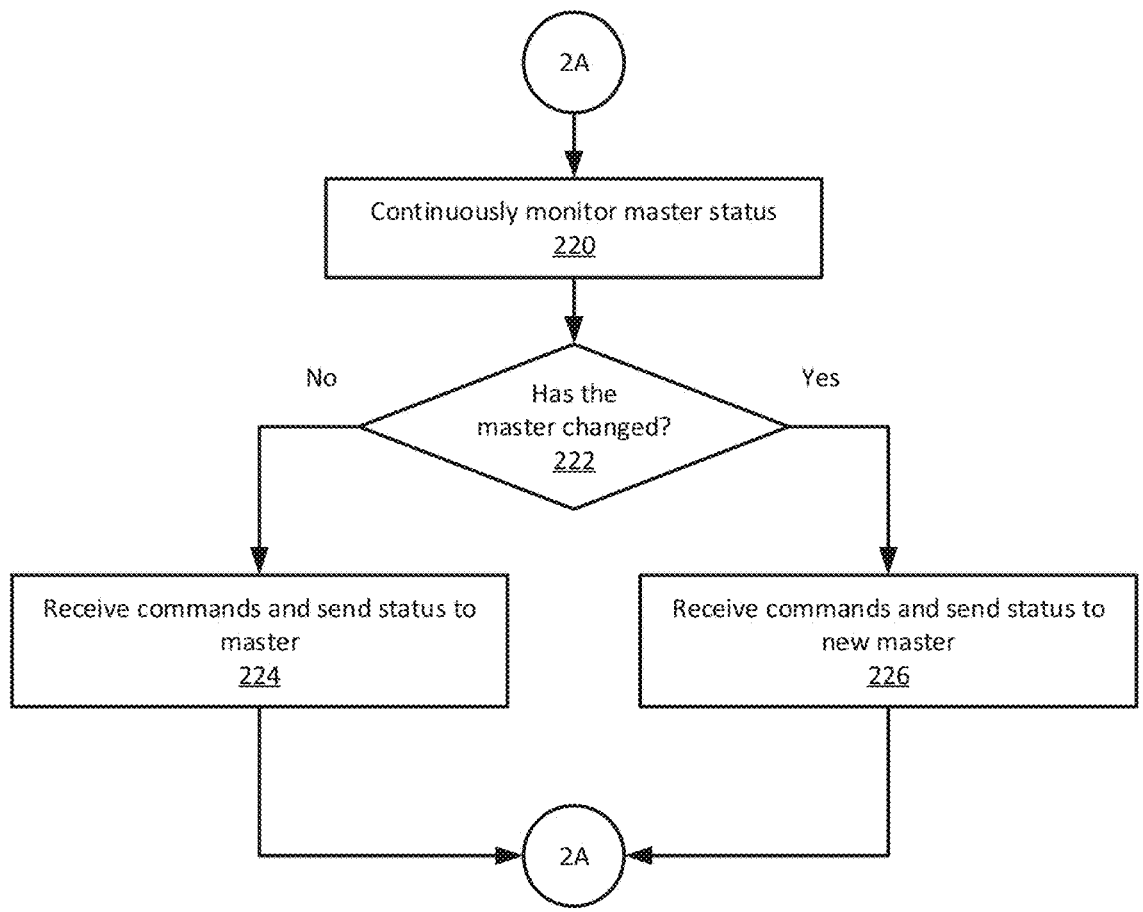
Figure 2C:
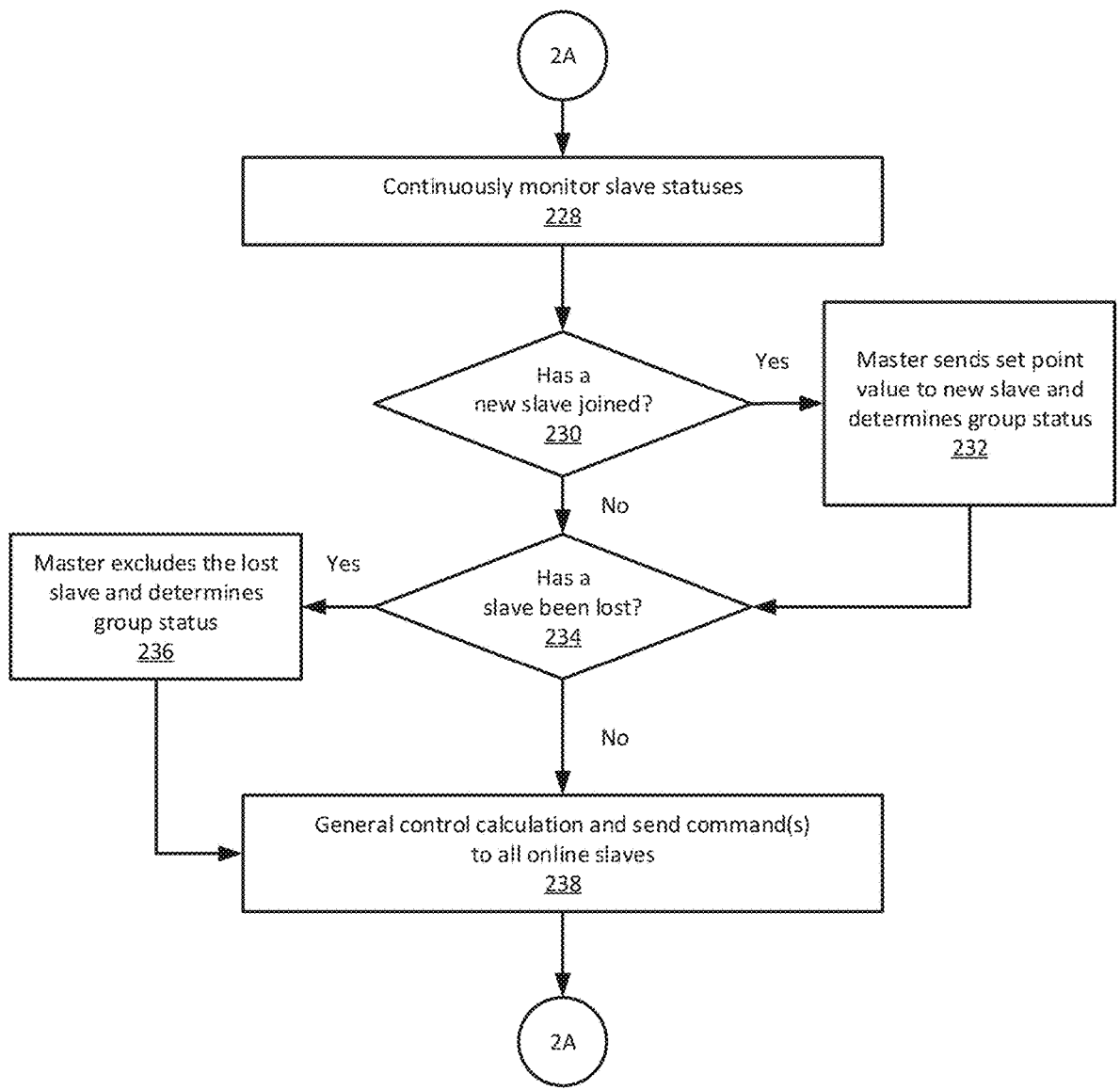

FIGS. 2A-2C are a flow diagram of an example of operations for group control using Service Data Objects (SDO) according to an embodiment. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

The following discussion refers to various situations where controllers send and receive data to each other. One or more of these operations may be implemented as function blocks, i.e., discreet operational units implemented in hardware and/or software. In some cases, one or more function blocks may inhibit sending any data unless the data has changed. For example, if the online quantity and/or statuses of controllers have not changed, then a function block may not send any quantity/status data over the bus. When the online quantity and/or statuses change, then the function block may be triggered to send the new value(s) over the bus. This inhibiting/triggering mechanism may thus help to preserve bus load and accordingly increase the number of group members that the system is capable of supporting. In general, some or all SDO frames may be suppressed unless a new value is detected.

In an embodiment, a controller (e.g., a controller 104 as illustrated in FIG. 1A) determines whether group control is enabled (Operation 202). Controllers may be configurable to operated either in a group mode (e.g., according to a shared setpoint, using an SDO protocol as described herein) or in a solo mode in which the controller manages operation of a single device without coordination with other devices. If group control is not enabled, then the controller proceeds to control the single device with which it is associated (Operation 204). For example, if the controller includes a proportional-integral-derivative (PID) mechanism, the controller may calculate its own PID, without reference to any shared setpoint.

In an embodiment, if group control is enabled, then the controller prepares task data (Operation 206). As described herein, tasks are unitary operations used by controllers in a group, in order to manage their operation as a group (e.g., according to a shared setpoint). Preparing task data may include preparing SDO frames for transmission. However, to preserve bus bandwidth, frame transmission may be suppressed until a triggering condition is satisfied (e.g., when a function block detects that a new set point is received and/or another trigger condition is satisfied). Alternatively or additionally, a controller may send some task data periodically, such as signals used to determine controller quantities and statuses.

In an embodiment, the controller determines the online quantity and statuses of other controllers in the group (Operation 208). Each controller may maintain, in memory, a table of the statuses of other controllers in the group. The controller may update the table, for example, based on signals received from other controllers in the group. The controller may update the table at particular intervals. For example, the controller may be configured to compare current statuses with prior statuses every 50 milliseconds, or using another time interval.

In an embodiment, the controller determines the current master controller for the group (Operation 210). The group may use a redundant master election mechanism. Master election may be based, for example, on the controller's respective ID's, with the highest or lowest-numbered controller being the designated master. Determining the current master may include one or more operations described below with respect to FIG. 3.

In an embodiment, the controller determines its current status (Operation 212). The controller may be one of: (a) a solo controller, i.e., the only controller in the group that is online, despite group control being enabled; (b) a slave controller, i.e., another controller in the group is the current master; or (c) the current master controller for one or more other controllers. A controller may switch between modes as the online statuses of controllers in the group change over time. For example, if all other controllers in the group go offline, then the controller may enter the solo mode.

If, at Operation 212, the controller determines that it is a solo controller, then it proceeds to control only a single device (Operation 204), as described above. The controller may continue to control only the single device until another controller comes online, at which point the two (or more controllers) may proceed to operate as a group, with one of the controllers being designated as the master and the other controller(s) being designated as slaves.

If, at Operation 212, the controller determines that it is a slave controller, then it continuously monitors the master status (Operation 220). In general, the controller may monitor the master status by monitoring the quantities and statuses of other controllers in the group (including their respective controller identifiers that may be used to select a master controller), including any controller (which may be itself) that has been designated as master. Based on the quantities and statuses of controllers in the group and their respective controller identifiers, the controller may determine whether the master has changed (Operation 222). Specifically, the controller determines whether any condition has changed such that a different controller should be designated master. For example, the current master may go offline. As another example, if the master election is based on controller ID's, a new controller may come online with a controller ID that would make that controller the master. As another example, a user may supply manual input designating a particular controller as the master. If the master has not changed, then the controller continues to receive commands from, and send status data to, the current master (Operation 224). If the master has changed, then the controller proceeds to receive commands from, and send status data to, the new master (Operation 226).

If, at Operation 212, the controller determines that it is the current master, then it continuously monitors the status of any slave controllers (Operation 228). The controller may monitor the slave statuses by monitoring the quantities and statuses of other controllers in the group, including any controller(s) (which may be itself) that has/have been designated as slave. Based on the quantities and statuses detected, the controller may determine whether a new slave controller has joined the group (Operation 230). A new slave controller may be a controller that was previously online and has been demoted to slave from master. If a new slave controller has joined the group, then the master controller may send the group's set point value to the new slave and determine the group status with the new slave controller included (Operation 232). Determining the group status may include computing a metric based on data received from other controllers in the group. For example, for a group that operates according to a shared set point of a particular variable (e.g., temperature, humidity, etc.), the group status may indicate an average value of the variable across the group, a maximum value of the variable among the controllers in the group, and/or a minimum value of the variable among the controllers in the group.

Alternatively or additionally, based on the quantities and statuses detected, the controller may determine whether a slave has been lost (Operation 234). A slave may be deemed "lost" if it announces that it is leaving the group, becomes unresponsive, or otherwise ceases to communicate with the group. If a slave has been lost, then the master controller may exclude the lost slave controller from the group and determine the group status with that slave controller omitted (Operation 236).

In an embodiment, once the master controller has determined a current group status (taking into account any new or lost slave controllers), the master controller performs a general control calculation and sends one or more commands to all the online slave controllers (Operation 238). The general control calculation determines one or more values used to control the slave devices. For example, if the group uses PID controllers, the general control calculation may be a PID calculation for coordinating the controller group based on a shared setpoint. The command(s) may include the computed value (e.g., PID value). When performing the general control calculation, the master may omit values that are outside of a reasonable range. For example, if one slave announces a temperature that is outside a normal temperature range while other slaves announce temperatures that are within the normal range, the master may treat the excessive temperature as a miscommunication and omit it from the general calculation.

One or more of the slave controllers may adjust operation of their respective device(s) based on the general control calculation. For example, based on a general PID calculation, a slave controller may increase a fan speed, decrease a fan speed, increase an air conditioning intensity, decrease an air conditioning intensity, increase dehumidification, decrease dehumidification, and/or apply another adjustment or combination thereof. When performing a general control calculation, taking into account new and/or lost controllers as described herein may help optimize performance of device group, such as air conditioner groups in data centers. For example, if an air conditioner fails, a general PID calculation may result in the remaining air conditioners increasing their operating power to compensate for the lost unit. Alternatively or additionally, this approach may allow for automatic rotation of devices (e.g., air conditioners), with each device periodically entering a rest/sleep status and the other devices compensating. When a device returns online (e.g., automatically recovers, returns online after a repair, or ends an automated rest/sleep cycle), then the device is detected and contributes again to the group status.

In an embodiment, whether the controller is a master controller or a slave controller, the controller may communicate tasks and task data to other controllers in the group (Operation 216). The controller may also communicate diagnostic data to other controllers in the group (Operation 218). As noted above, a master controller may communicate a general control calculation. Alternatively or additionally, a controller may communicate other kinds of tasks and/or task data, depending on the type(s) of devices in the group and whether a sending condition is triggered. For example, controllers in an air conditioning group may communicate current temperatures, humidity, etc. Some kinds of data may be given communication priority. For example: diagnostic action messages may be given first priority; slaves' emergency status variables may be given second priority; the master's important commands (e.g., general PID output commands for all online slave controllers) and EEPROM-type setup variables (e.g., persistent setup variables as discussed above) may be given third priority; slaves' routine status variables may be given fourth priority; and the master's routine commands (e.g., commands that do not require a rapid response, rest/sleep cycle time changes for air conditioners, enabling/disabling air conditioner functions, and/or other kinds of non-urgent commands) and communication of infrequently-changed EEPROM-type setup variables (e.g., PID regulation parameters) may be given fifth priority. Other priority schemes may be used.

In an embodiment, the controller continues to operate until it is powered down or otherwise disabled.

Figure 3:
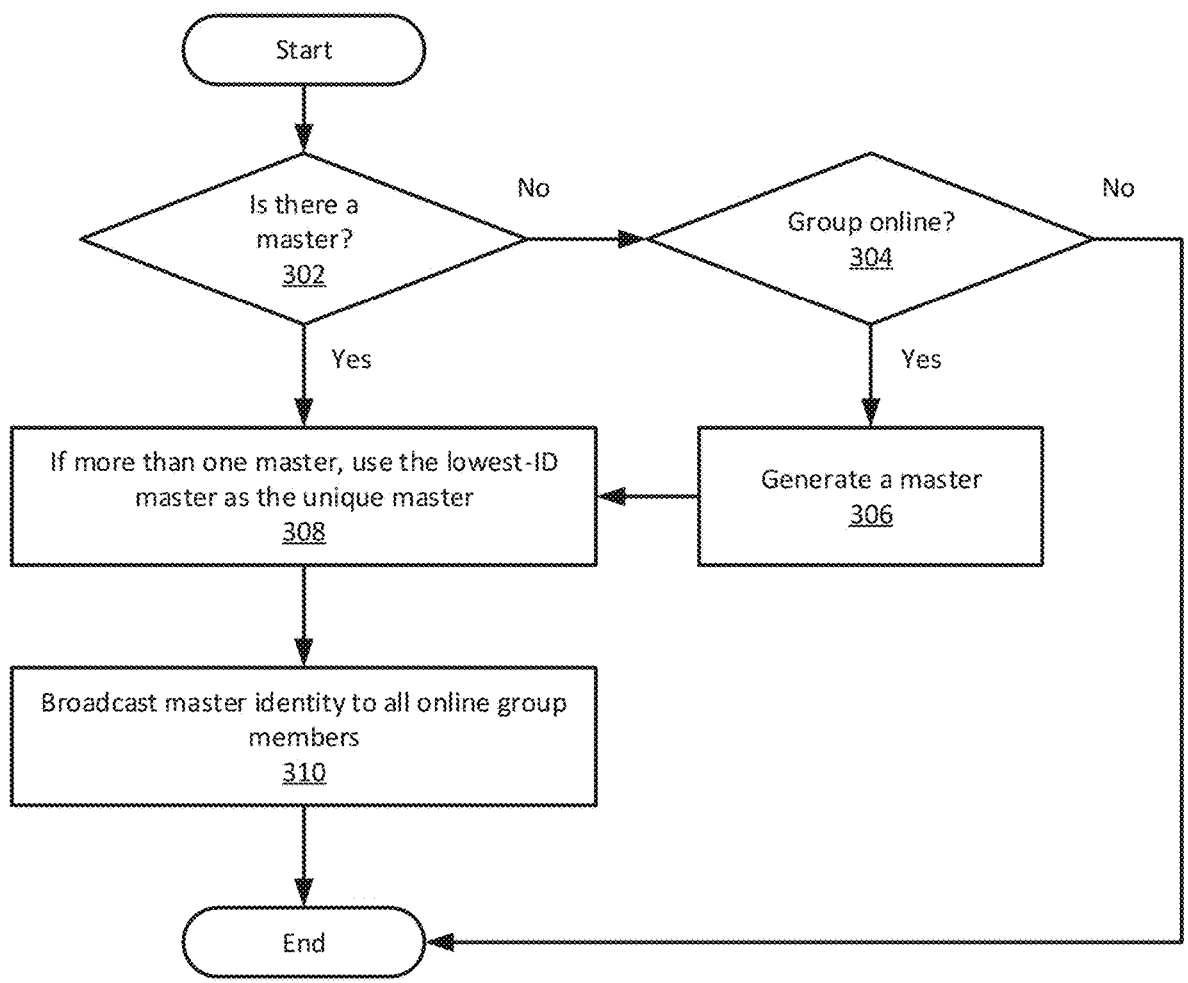
FIG. 3 is a block diagram of an example of selecting a master according to an embodiment.

FIG. 3 is a block diagram of an example of selecting a master according to an embodiment. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a controller determines whether there is currently a master (302). To determine whether there is currently a master, the controller may inspect the current quantities and statuses of controllers in the group (including their respective controller identifiers). The designated master may be based on controller ID's. For example, the controller with the highest-numbered or lowest-numbered ID may be designated as master. If there is not currently a master, then the controller determines whether its group is online (Operation 304). If the group is not online, then a master is not needed and the process ends. If the group is online, then the controller generates a new master (Operation 306). To generate a new master, the controller may identify the controller in the group that satisfies one or more criteria for designating a master. For example, the controller with the highest-numbered or lowest-numbered ID may be designated as master.

In an embodiment, if there is more than one master controller (for example, if there is a hardware fault that causes a group to split into two groups that each designate their own masters, and those groups are subsequently rejoined, or due to some other circumstance that results in two or more designated masters), then it is necessary to designate one of those controllers as the unique master. In some examples, the controller with the highest or lowest ID may be designated as the unique master (Operation 308). Once a unique master controller has been identified, the controller broadcasts the master identity to all online group members (Operation 310).

Figure 4A:
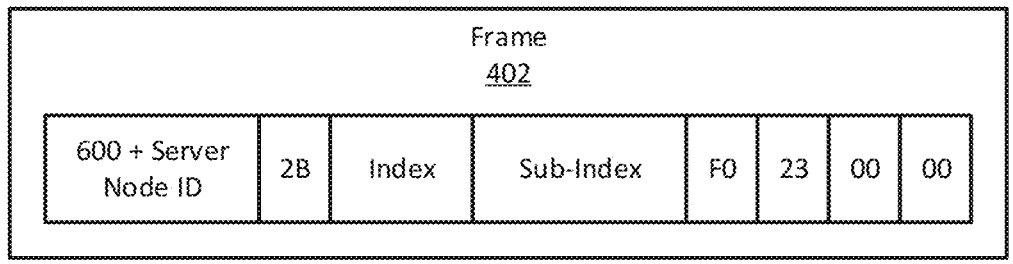
FIGS. 4A-4C are block diagrams of examples of frames according to an embodiment.
Figure 4B:
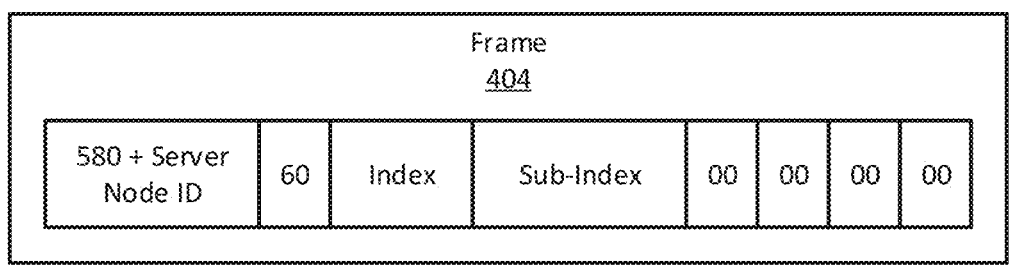
Figure 4C:
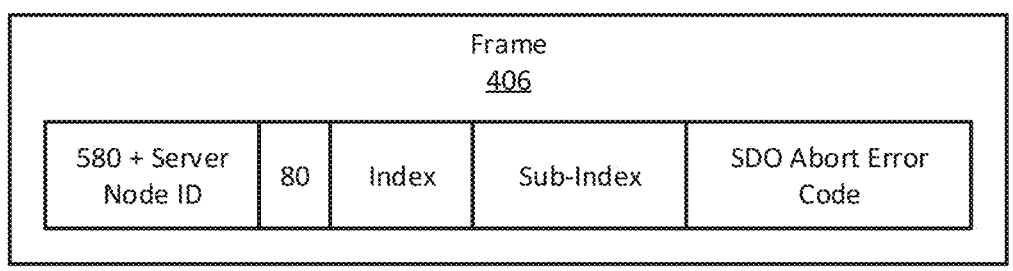

FIGS. 4A-4C are block diagrams of examples of frames according to an embodiment. Specifically, FIGS. 4A-4C illustrate examples of how SDO frames may be used to transmit messages in a controller group as described herein. In these examples, the SDO expedited protocol is used. As illustrated in FIG. 4A, to write the data 0x23F0 to a target node's object dictionary, a client node prepares and transmits a frame 402. If the write operation is successful, then the target node responds with the frame 404 illustrated in FIG. 4B. If the write operation fails, then the target node responds with the frame 406 illustrated in FIG. 4C, which includes an SDO abort error code, indicating the operation is aborted.

Figure 5A:
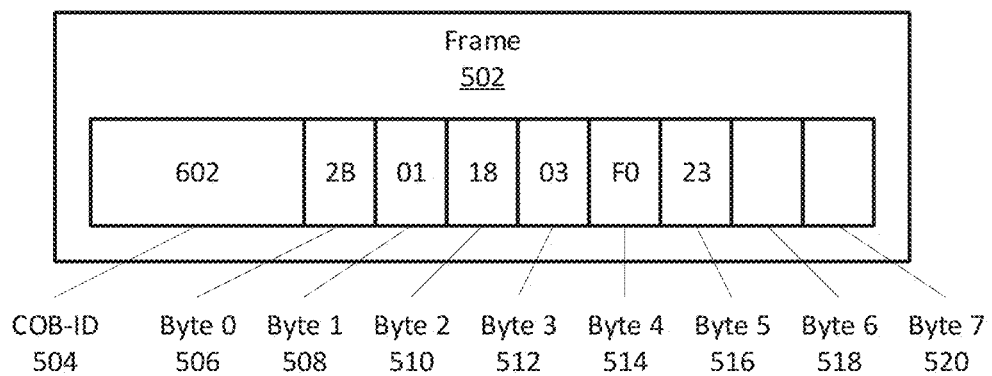
FIGS. 5A-5B are block diagrams of examples of frames according to an embodiment.
Figure 5B:
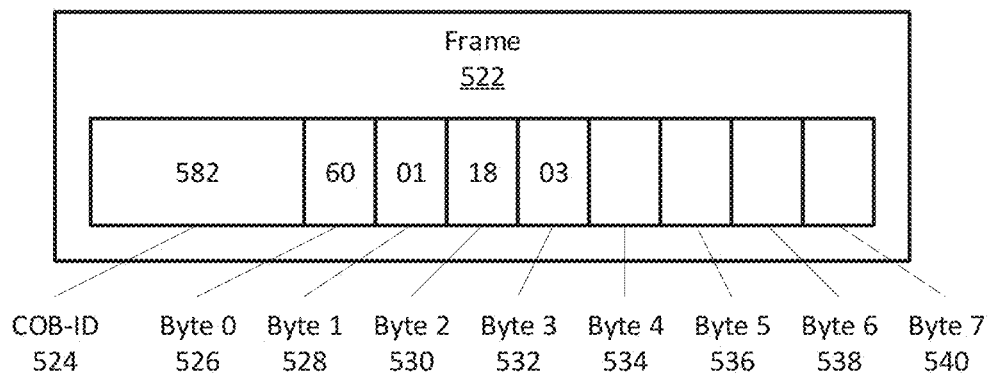

FIGS. 5A-5B are block diagrams of examples of frames according to an embodiment. FIG. 5A illustrates an example of byte allocation in a frame 502 addressed from a client node to a target node. In this example, the frame 502 starts with a communication object identifier (COB-ID) 506 that uniquely identifies the target node. Together, the COB-ID 506 and the remaining bytes 506-520 encode the hexadecimal message "602 2B 01 18 03 F0 23 00 00." FIG. 5B illustrates an example of byte allocation in a response frame 522 addressed from the target node to the client node. In this example, the response frame 522 starts with a COB-ID 524 that uniquely identifies the client node. Together, the COB-ID 524 and the remaining bytes 526-540 encode the hexadecimal message "582 60 01 18 03 00 00 00 00."

Figure 6A:
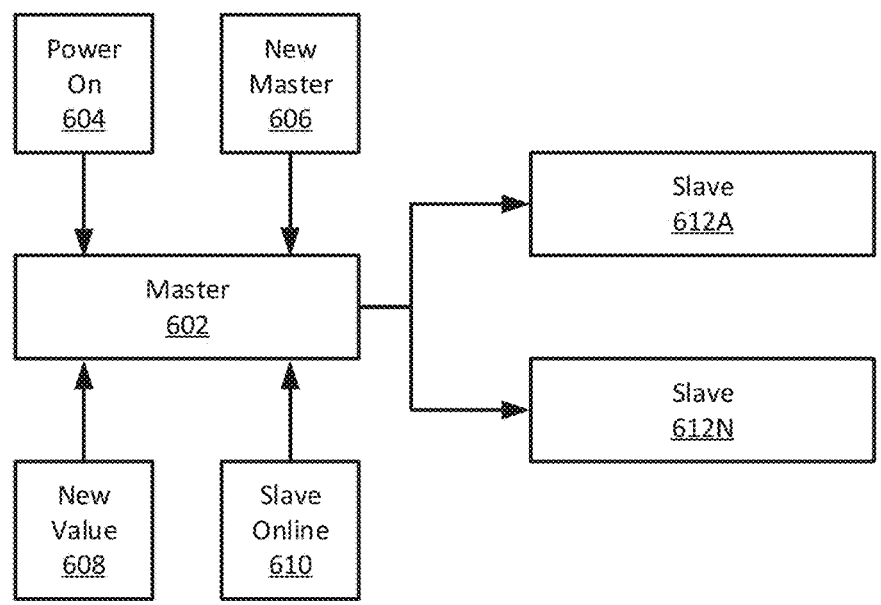
FIGS. 6A-6B are block diagrams of examples of master-slave communication according to an embodiment.
Figure 6B:
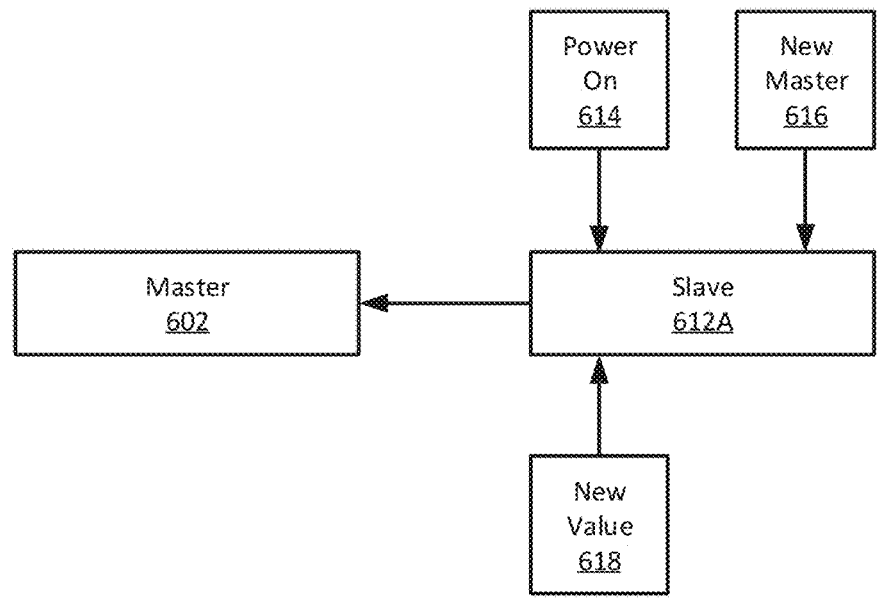

FIGS. 6A-6B are block diagrams of examples of master-slave communication according to an embodiment. In FIG. 6A, a master 602 is configured to received data indicating power on 604, designation of a new master 606, a new setpoint value 608, presence of a new slave 610, and/or other kinds of information. The master 602 is configured to transmit setpoints and/or other commands to slaves 612A-N. For each slave 612, the master 602 may attempt to transmit a setpoint and/or other command up to a predetermined number of times (e.g., 3 times) before generating a communication fault warning signal. If the master 602 receives a response from a slave 612, then the master 602 may reset the attempt counter for that slave 612. In FIG. 7B, a slave 612A is configured to receive data indicating power on 614, designation of a new master 616, a new setpoint value 618, and/or other kinds of information. The slave 612A is configured to transmit information as process values to the master 602. In an embodiment, unless initiated by the presence of new information, transmissions between the master 602 and the slaves 612A-N are suppressed.

Figure 7:
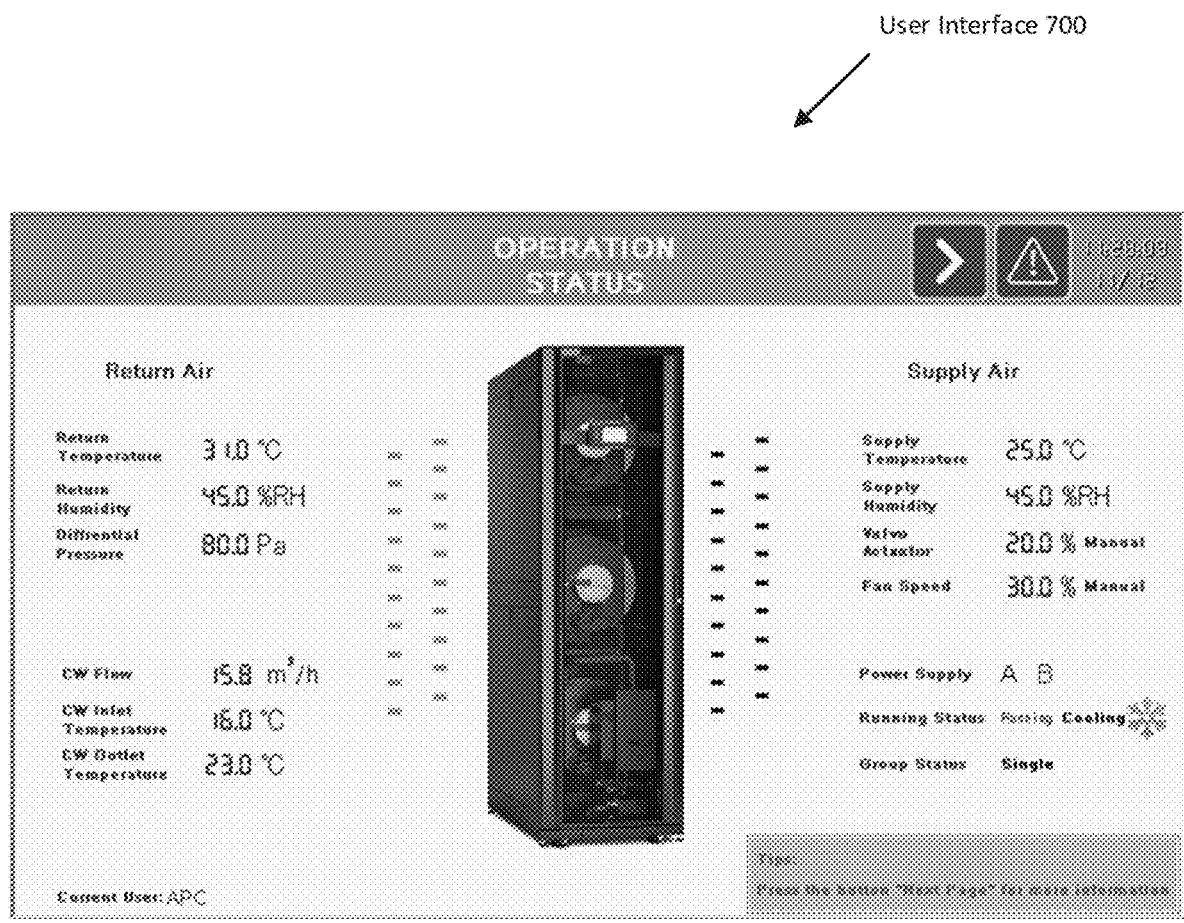
FIG. 7 illustrates an example of a user interface according to an embodiment.

FIG. 7 illustrates an example of a user interface 700 according to an embodiment. The user interface 700 illustrated in FIG. 7 may correspond to the user interface 102 of FIG. 1A. The user interface 700 provides information about the operation of a group of devices, each under control of a respective device controller. Some or all of the device controllers may be configured to communicate with each other using an SDO protocol, as described herein. In this example, the devices are air conditioning units in a data center and the user interface 700 provides status information about the room and/or specific server units. Such information may include, for example, information about return air, supply air, a power supply, individual unit and/or group running status, unit status (e.g., solo/single, master, or slave), etc. The user interface 700 may include controls (not shown) that allow a user to adjust a setpoint for cooling the room, which may then be used for group control as described herein.

In an embodiment, a system includes one or more device controllers, including one or more hardware processors, that are configured to perform any of the operations described herein and/or recited in any of the claims.

In an embodiment, a non-transitory computer-readable storage medium stores instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing device controllers (i.e., computing device controllers specially configured to perform certain functionality). The special-purpose computing device controller(s) may be hard-wired to perform the techniques and/or may include digital electronic device controllers such as one or more application-specific integrated circuits (ASICs), field programmable gate arrays (FPGAs), and/or network processing units (NPUs) that are persistently programmed to perform the techniques. Alternatively or additionally, a computing device controller may include one or more general-purpose hardware processors programmed to perform the techniques pursuant to program instructions in firmware, memory, and/or other storage. Alternatively or additionally, a special-purpose computing device controller may combine custom hard-wired logic, ASICs, FPGAs, or NPUs with custom programming to accomplish the techniques. A special-purpose computing device controller may include a desktop computer system, portable computer system, handheld device controller, networking device controller, and/or any other device controller(s) incorporating hard-wired and/or program logic to implement the techniques.

Figure 8:
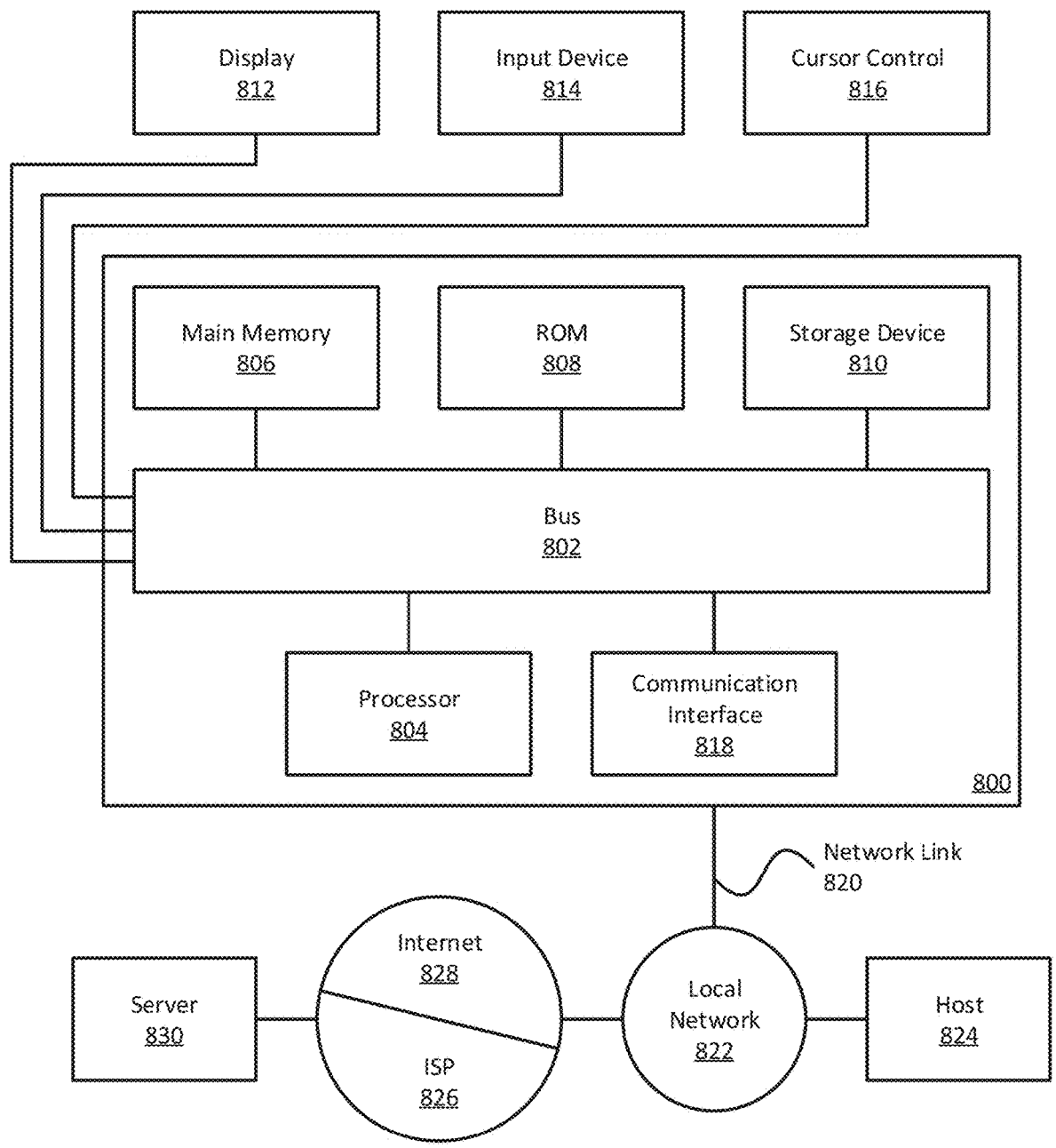
FIG. 8 is a block diagram of an example of a computer system according to an embodiment.

For example, FIG. 8 is a block diagram of an example of a computer system 800 according to an embodiment. Computer system 800 includes a bus 802 or other communication mechanism for communicating information, and a hardware processor 804 coupled with the bus 802 for processing information. Hardware processor 804 may be a general-purpose microprocessor.

Computer system 800 also includes a main memory 806, such as a random access memory (RAM) or other dynamic storage device controller, coupled to bus 802 for storing information and instructions to be executed by processor 804. Main memory 806 also may be used for storing temporary variables or other intermediate information during execution of instructions to be executed by processor 804. Such instructions, when stored in one or more non-transitory storage media accessible to processor 804, render computer system 800 into a special-purpose machine that is customized to perform the operations specified in the instructions. Computer system 800 further includes a read only memory (ROM) 808 or other static storage device controller coupled to bus 802 for storing static information and instructions for processor 804. A storage device controller 810, such as a magnetic disk or optical disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device controller for displaying information to a computer user. An input device controller 814, including alphanumeric and other keys, may be coupled to bus 802 for communicating information and command selections to processor 804. Alternatively or additionally, computer system 800 may receive user input via a cursor control 816, such as a mouse, a trackball, a trackpad, or cursor direction keys for communicating direction information and command selections to processor 804 and for controlling cursor movement on display 812. This input device controller typically has two degrees of freedom in two axes, a first axis (e.g., x) and a second axis (e.g., y), that allows the device controller to specify positions in a plane. Alternatively or additionally, computer system 8 may include a touchscreen. Display 812 may be configured to receive user input via one or more pressure-sensitive sensors, multi-touch sensors, and/or gesture sensors. Alternatively or additionally, computer system 800 may receive user input via a microphone, video camera, and/or some other kind of user input device controller (not shown).

Computer system 800 may implement the techniques described herein using customized hard-wired logic, one or more ASICs or FPGAs, firmware, and/or program logic which in combination with other components of computer system 800 causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device controller 810. Execution of the sequences of instructions contained in main memory 806 causes processor 804 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device controller 810. Volatile media includes dynamic memory, such as main memory 806. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 802. Transmission media may also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 800 may receive the data from the network and place the data on bus 802. Bus 802 carries the data to main memory 806, from which processor 804 retrieves and executes the instructions. The instructions received by main memory 806 may optionally be stored on storage device controller 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data device controllers. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822, and communication interface 818.

The received code may be executed by processor 804 as it is received, and/or stored in storage device controller 810, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device controller. A physical node may be a function-specific hardware device controller. Examples of function-specific hardware device controllers include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device controller and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital device controllers, virtual machines, application instances, and threads) corresponding to different tenants are isolated to tenant-specific overlay networks maintained by the multi-tenant computer network. As an example, packets from any source device controller in a tenant overlay network may only be transmitted to other device controllers within the same tenant overlay network. Encapsulation tunnels may be used to prohibit any transmissions from a source device controller on a tenant overlay network to device controllers in other tenant overlay networks. Specifically, the packets, received from the source device controller, are encapsulated within an outer packet. The outer packet is transmitted from a first encapsulation tunnel endpoint (in communication with the source device controller in the tenant overlay network) to a second encapsulation tunnel endpoint (in communication with the destination device controller in the tenant overlay network). The second encapsulation tunnel endpoint decapsulates the outer packet to obtain the original packet transmitted by the source device controller. The original packet is transmitted from the second encapsulation tunnel endpoint to the destination device controller in the same particular overlay network.

What is claimed is:

1. A device controller configured to perform operations comprising:

receiving, from a plurality of device controllers that are configured to control a plurality of devices so that the plurality of devices operate based on a shared set point, a plurality of Service Data Objects (SDO) messages using an SDO protocol;

determining that the device controller is a master device controller for the plurality of device controllers, based at least on the plurality of SDO messages; and sending a setpoint update message comprising a modified value of the shared set point, using the SDO protocol, to a plurality of slave device controllers in the plurality of device controllers, wherein a slave device controller in the plurality of slave device controllers is configured to adjust operation of at least one slave device in the plurality of devices, based at least on the setpoint update message.

2. The device controller of claim 1, the operations further comprising:

detecting a presence of a new slave device controller; and responsive to detecting the presence of the new slave device controller, sending the modified value of the shared setpoint to the new slave device controller, using the SDO protocol.

3. The device controller of claim 1, the operations further comprising:

prior to detecting the presence of a new slave device controller, computing a group metric for the group; and responsive to detecting the presence of the new slave device controller, computing a revised group metric for the group that includes the new slave device controller.

4. The device controller of claim 1, the operations further comprising:

suppressing transmission of at least one SDO message in the plurality of SDO messages until a change in a value associated with a function of the at least one SDO message is detected.

5. The device controller of claim 1, wherein determining that the device controller is the master device controller for the plurality of device controllers comprises determining, based at least on the plurality of SDO messages, that the device controller has at least one of a lower device controller identifier or a higher device controller identifier than another device controller identifier associated with another device controller.

6. The device controller of claim 1, the operations further comprising:

computing a group metric for the group;

determining that a particular slave device controller in the plurality of slave device controllers is offline; and responsive to determining that the particular slave device controller is offline, computing a revised group metric for the group that excludes the particular slave device controller.

7. The device controller of claim 1, wherein at least one SDO message in the plurality of SDO messages comprises a target address, an object dictionary index, an object area sub-index, and a device status value, and wherein the object dictionary address and object area sub-index correspond to a location, in a manufacturer-specific section of an object dictionary of a device at the target address, in which to write the device status value.

8. A system comprising:

a plurality of devices; and a plurality of device controllers that are configured to control the plurality of devices so that the plurality of devices operate based on a shared set point, at least by collectively performing operations comprising:

exchanging a plurality of Service Data Objects (SDO) messages using an SDO protocol;

determining a master device controller in the plurality of device controllers, based at least on the plurality of SDO messages;

sending a setpoint update message comprising a modified value of the shared set point, using the SDO protocol, from the master device controller to a plurality of slave device controllers in the plurality of device controllers; and adjusting operation of a slave device in the plurality of slave devices, by at least one slave device controller in the plurality of slave device controllers, based at least on the setpoint update message.

9. The system of claim 8, the operations further comprising:

detecting a presence of a new slave device controller; and responsive to detecting the presence of the new slave device controller, sending the modified value of the shared setpoint to the new slave device controller, using the SDO protocol.

10. The system of claim 9, the operations further comprising:

suppressing transmission of at least one SDO message in the plurality of SDO messages until a change in a value associated with a function of the at least one SDO message is detected.

11. The system of claim 8, the operations further comprising:

prior to detecting the presence of a new slave device controller, computing a group metric for the group; and responsive to detecting the presence of the new slave device controller, computing a revised group metric for the group that includes the new slave device controller.

12. The system of claim 8, the operations further comprising:

determining that the master device controller is offline; and determining a new master device controller, from the plurality of slave device controllers, based at least on the plurality of SDO messages.

13. The system of claim 12, wherein determining the new master device controller comprises determining, based at least on the plurality of SDO messages, a device controller in the plurality of slave device controllers having at least one of a lower device controller identifier or a higher device controller identifier than another device controller.

14. The system of claim 8, the operations further comprising:

computing a group metric for the group;

determining that a particular slave device controller in the plurality of slave device controllers is offline; and responsive to determining that the particular slave device controller is offline, computing a revised group metric for the group that excludes the particular slave device controller.

15. One or more non-transitory machine-readable media storing instructions that, when executed by one or more processors, cause:
  exchanging, by a plurality of device controllers that are configured to control a plurality of devices so that the plurality of devices operate based on a shared set point, a plurality of Service Data Objects (SDO) messages using an SDO protocol;
  determining a master device controller in the plurality of device controllers, based at least on the plurality of SDO messages;
  sending a setpoint update message comprising a modified value of the shared set point, using the SDO protocol, from the master device controller to a plurality of slave device controllers in the plurality of device controllers; and
  adjusting operation of a slave device in the plurality of devices, by at least one slave device controller in the plurality of slave device controllers, based at least on the setpoint update message.

16. The one or more non-transitory machine-readable media of claim 15, further storing instructions that, when executed by one or more processors, cause:
  detecting a presence of a new slave device controller; and
  responsive to detecting the presence of the new slave device controller, sending the modified value of the shared setpoint to the new slave device controller, using the SDO protocol.

17. The one or more non-transitory machine-readable media of claim 15, further storing instructions that, when executed by one or more processors, cause:
  prior to detecting the presence of a new slave device controller, computing a group metric for the group; and
  responsive to detecting the presence of the new slave device controller, computing a revised group metric for the group that includes the new slave device controller.

18. The one or more non-transitory machine-readable media of claim 15, further storing instructions that, when executed by one or more processors, cause:
  determining that the master device controller is offline; and
  determining a new master device controller, from the plurality of slave device controllers, based at least on the plurality of SDO messages.

19. The one or more non-transitory machine-readable media of claim 18, wherein determining the new master device controller comprises determining, based at least on the plurality of SDO messages, a device controller in the plurality of slave device controllers having at least one of a lower device controller identifier or a higher device controller identifier than another device controller.

20. The one or more non-transitory machine-readable media of claim 15, further storing instructions that, when executed by one or more processors, cause:
  computing a group metric for the group;
  determining that a particular slave device controller in the plurality of slave device controllers is offline; and
  responsive to determining that the particular slave device controller is offline, computing a revised group metric for the group that excludes the particular slave device controller.

* * * * *